United States Patent
Legouable et al.

(10) Patent No.: US 8,995,549 B2
(45) Date of Patent: Mar. 31, 2015

(54) METHOD FOR TRANSMITTING A SOURCE SIGNAL, METHOD FOR RECEIVING A TRANSMITTED SIGNAL, CORRESPONDING TRANSMITTER, RECEIVER, SIGNAL AND COMPUTER PROGRAMS

(75) Inventors: Rodolphe Legouable, Cesson Sevigne (FR); Dinh Thuy Phan Huy, Paris (FR); Isabelle Siaud, Rennes (FR)

(73) Assignee: Orange, Paris (FR)

( * ) Notice: Subject to any disclaimer, the term of this patent is extended or adjusted under 35 U.S.C. 154(b) by 304 days.

(21) Appl. No.: 13/516,563

(22) PCT Filed: Dec. 14, 2010

(86) PCT No.: PCT/FR2010/052722
§ 371 (c)(1),
(2), (4) Date: Sep. 17, 2012

(87) PCT Pub. No.: WO2011/073571
PCT Pub. Date: Jun. 23, 2011

(65) Prior Publication Data
US 2013/0003884 A1     Jan. 3, 2013

(30) Foreign Application Priority Data
Dec. 17, 2009    (FR) ...................................... 09 59152

(51) Int. Cl.
*H04B 7/02*      (2006.01)
*H04B 7/06*      (2006.01)

(52) U.S. Cl.
CPC ............ *H04B 7/0617* (2013.01); *H04B 7/0626* (2013.01)
USPC ............ 375/267; 375/260; 375/299; 375/347

(58) Field of Classification Search
CPC ... H04B 7/0617; H04B 7/0452; H04L 27/367
USPC .................................. 375/260, 267, 299, 347
See application file for complete search history.

(56) References Cited

U.S. PATENT DOCUMENTS

| | | | |
|---|---|---|---|
| 7,224,942 B2 * | 5/2007 | Dent ............................... | 455/69 |
| 8,391,797 B2 * | 3/2013 | Tee et al. ...................... | 455/63.1 |
| 8,416,874 B2 * | 4/2013 | Wang et al. ................... | 375/267 |

FOREIGN PATENT DOCUMENTS

| | | |
|---|---|---|
| EP | 1681783 A1 | 7/2006 |
| WO | 02061969 A1 | 8/2002 |

OTHER PUBLICATIONS

International Search Report dated May 3, 2011 for corresponding International Application No. PCT/FR2010/052722, filed Dec. 14, 2010.

(Continued)

*Primary Examiner* — Leon Flores
(74) *Attorney, Agent, or Firm* — David D. Brush; Westman, Champlin & Koehler, P.A.

(57) ABSTRACT

A method and apparatus are provided for transmitting a source signal including a plurality of binary sequences to NR receiving antennas, where NR is no lower than 2. The method implements, for at least one first binary sequence of the source signal, pre-filtering for focusing a signal to be transmitted on at least one of the reception antennas, referred to as the target antenna. The target antenna and the associated focus pre-filtering step are selected according to a value of the first binary sequence intended for being considered as received. The method also includes transmitting the pre-filtered signal.

17 Claims, 6 Drawing Sheets

(56) References Cited

OTHER PUBLICATIONS

French Search Report and Written Opinion dated Jul. 29, 2010 for corresponding French Application No. 0959152, filed Dec. 17, 2009.

International Preliminary Report on Patentability and English translation of the Written Opinion dated Aug. 7, 2012 for corresponding International Application No. PCT/FR2010/052722, field Dec. 14, 2010.

* cited by examiner

METHOD FOR TRANSMITTING A SOURCE SIGNAL, METHOD FOR RECEIVING A TRANSMITTED SIGNAL, CORRESPONDING TRANSMITTER, RECEIVER, SIGNAL AND COMPUTER PROGRAMS

CROSS-REFERENCE TO RELATED APPLICATIONS

This Application is a Section 371 National Stage Application of International Application No. PCT/FR2010/052722, filed Dec. 14, 2010, which is incorporated by reference in its entirety and published as WO 2011/073571 on Jun. 23, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communications by wireless means (radio transmission).

More specifically, the disclosure pertains to the sending and receiving of signals in a multiple-antenna transmission system implementing at least one transmitting antenna and at least two receiving antennas (SIMO or Single Input Multiple Output systems or MIMO or Multiple Input Multiple Output systems).

The disclosure pertains more particularly to a technique for sending and receiving, which enables the utmost use of the spatial diversity and transmission capacity of a multiple-antenna system while at the same time minimizing complexity at reception.

BACKGROUND OF THE DISCLOSURE

The prior art is relatively extensive as regards MIMO systems.

In such transmission systems implementing a plurality of sending and/or receiving antennas, it is classically sought to exploit spatial diversity to the utmost in order to increase the flow rate or the efficiency of transmission, or again to obtain a compromise between these two constituent features.

However, one drawback of the techniques enabling efficient exploitation of spatial diversity, such as space-time block codes (STBC), for example of the Alamouti type, is that they do not make it possible to optimize transmission capacity. In other words, these prior-art techniques can be used only for data transmission at low bit rates.

Conversely, multiple-antenna transmission techniques, which provide for optimal efficiency, as in the case for example of techniques based on spatial multiplexing, have the drawbacks of requiring at least as many antennas when receiving as when sending, not making optimal use of diversity and increasing complexity, mainly at reception.

Other techniques based on linear dispersion codes have then been proposed. These techniques seek a compromise between STBC codes and spatial multiplexing by optimizing both capacity and exploitation of diversity in conjunction. Unfortunately, no method for the systematic building of such optimal codes has been proposed to date.

It is also possible to cite pre-encoding techniques based on the use of unitary encoding matrices. Although these techniques enable optimal use of diversity, they rely on the use of large-sized matrices, which are not always compatible with the use of small-sized transmission frames.

Combined with spatial multiplexing, these linear pre-encoding techniques make it possible, in the case of certain antenna configurations, to optimize the diversity and capacity of a transmission system. However, these optimal performance values are attained solely at high signal-to-noise ratios and for antenna configurations where the number of transmitting antennas is smaller than or equal to the number of receiving antennas.

Another major drawback of these systems lies in the receiver used, which must be of a maximum likelihood type, also known as ML type. These ML receivers are complex to implement and, because of their complexity, they restrict the size of the pre-encoding matrix to the number of transmitting antennas of the system.

There is therefore a need for a novel technique to increase spectral efficiency and the performance of a radio transmission while at the same time achieving transmission of very low complexity, especially at reception.

SUMMARY

An illustrative embodiment of the invention proposes a novel solution which does not have all these drawbacks of the prior art, in the form of a method of transmission of a source signal comprising a plurality of binary sequences towards $N_R$ receiving antennas, with $N_R$ being greater than or equal to 2.

According to an embodiment of the invention, such a method implements, for at least one first binary sequence of said source signal, a pre-filtering for focusing a signal to be sent on at least one of said receiving antennas, called a target antenna, said target antenna and said associated pre-filtering for focusing being selected according to a value of said first binary sequence intended for being considered as received, and a step for sending said pre-filtered signal.

Thus, an embodiment of the invention relies on a novel and inventive approach to signal encoding, enabling the encoding of a binary value of a source signal, called a binary sequence, by a position of a receiving antenna.

Indeed, an embodiment of the invention associates a binary value with a receiving antenna in order to focus the signal to be sent on this receiving antenna called a target antenna, according to the binary value of the source signal intended for being considered as received by a receiver.

In this way, a receiver, in detecting which receiving antenna is the target antenna, can identify the binary value that it must consider as received, namely the binary value associated with the target antenna, without this value having been transmitted by the transmitter.

Indeed, the signal focused by the transmitter can be a simple pulse since the receiver can deduce the binary value from the detection of the target antenna and a known association between a binary value and an antenna.

Thus, more information can be transmitted with reduced complexity for the receiver.

The signal to be sent is the one effectively sent by the transmitter and focused on at least one target antenna, chosen according to a value of a binary sequence of a source signal intended for being considered as received by a receiver.

It is considered that the transmitter implements at least one transmitting antenna and that the receiver implements at least two receiving antennas.

If we consider, for example, a binary sequence corresponding to two bits, four receiving antennas enable optimum use of the method according to an embodiment of the invention, each of the four antennas being associated with one of the four values (00, 01, 10, 11) which can take a binary sequence of this kind.

According to one embodiment of the invention, the method of transmission comprises a preliminary phase of configuration comprising a step for associating a binary sequence value with one of said $N_R$ receiving antennas.

Thus, a preliminary configuration phase consists in associating a binary value with a receiving antenna and in doing so for the binary sequence or sequences of the source signal, which are to be considered as received. We thus obtain a plurality of associations of a binary value with a receiving antenna.

When it is desired to transmit a source signal according to an embodiment of the invention, this signal is sub-divided into binary sequences according to the number of receiving antennas available for example. For each binary sequence thus defined, the corresponding target antenna is selected on the basis of associations determined during the configuration phase and then a signal to be sent, for example a pulse, or a modulated signal, is focused on the selected antenna, by pre-filtering, and then the pre-filtered signal is sent.

According to an embodiment of the invention, the configuration phase implements a time-reversal step delivering at least one pre-filter coefficient associated with each of the receiving antennas.

Thus, an embodiment of the invention determines the pre-filtering to be applied to the signal to be sent by means of a time-reversal or spatial-focusing technique. Thus, with each receiving antenna, it is possible to associate one or more pre-filter coefficients to be applied to focus a signal towards this antenna. A time-reversal technique of this kind, which comes from the field of acoustic waves and submarine communications, is based on the property of time invariance of the representation of the transmission channel and reciprocity of the solution of the wave propagation equation by time reversal. This invariance permits a wave to get back-propagated in such a way that it can replay the scene identically between its outbound phase and its return phase. The result of this is a representation of the channel in the form of a function of auto-correlation of the channel, the effect of which is to modify the propagation channel when sending and, in certain cases, to focus the energy on a restricted number of echoes of the pulse response of the propagation channel.

Energy can thus be focused on at least one specific chosen receiving antenna.

A pre-filter coefficient of this kind corresponds for example to the temporal inverse of the pulse response of the channel between one or more transmitting antennas and one of the $N_R$ receiving antennas. The pre-filtering then comprises for example a step of convolution of the signal to be sent by the pre-filter coefficient associated with the target antenna.

According to one specific aspect of an embodiment of the invention, the transmission method comprises a step for transmitting, to at least one of said $N_R$ receiving antennas, of at least one predetermined rule of association for associating a binary sequence value with one of said $N_R$ receiving antennas.

According to this embodiment of the invention, the association or associations determined during the preliminary configuration phase are transmitted by the transmitter to the receiver and/or to one or more of the receiving antennas so that it is possible, at reception, to identify the binary value corresponding to the chosen target receiving antenna.

According to other embodiments, the association or associations determined during the preliminary phase are known to the receiver, when it is put into service, by preliminary programming for example.

According to an embodiment of the invention, the method of transmission comprises a step for storing at least one predetermined rule of association of a binary sequence value with one of said $N_R$ receiving antennas in a table of correspondence.

According to another aspect of an embodiment of the invention, the method of transmission comprises at least two simultaneous steps for sending a pre-filtered signal to at least two distinct target antennas.

This embodiment of the invention enables the transmission of more information simultaneously and therefore increases the transmission bit rate.

According to one particular aspect of an embodiment of the invention, the method of transmission comprises, in addition, a step for sending a piece of information for assistance in determining, at reception, at least one binary sequence of said source signal.

Thus, according to this embodiment, the invention enables the transmission of a piece of information for decision assistance at reception, for example to provide additional information at reception on the focusing operation or focusing operations selected for the target antenna or antennas chosen.

For example, should several simultaneous focusing operations be implemented, this decision assistance information may indicate the order of the binary sequences considered as received by the receiver on each of the identified target antennas so as to determine the source signal to be considered as received.

According to one particular embodiment of the invention, the method of transmission comprises, in addition, a step for modulating a second binary sequence of said source signal delivering said signal to be sent.

Thus, the method of an embodiment of the invention enables the transmission also of information in the form of a modulated signal in addition to the information encoded by the position of the target antenna.

For example, in the case of a QAMX modulation, with $X=2^{nb}$, where nb is the number of bits per modulation symbol, it is possible to encode $\log_2(N_R)$ bits corresponding to a first binary sequence of the source signal, by the position of the target antenna, and the $(nb-\log_2(N_R))$ remaining bits corresponding to a second binary sequence of the source signal, are modulated classically. We thus obtain a QAMX modulation simplified to a $QAM(2^{nb\ log_2(N_R)})$ modulation by spatial focusing of the energy on a receiving antenna. It is then also possible to simplify the structure of the receiver in implementing only a $QAM(2^{nb-log_2(N_R)})$ type of modulation since $\log_2(N_R)$ bits of the signal correspond to the position of the antenna. Consequently, it is possible to transmit for example a QAM16 in MIMO (Multiple Input Multiple Output) modulation, obtaining the performance of a QPSK SISO (Single Input Single Output) modulation.

In particular, a modulation of this kind is an in-quadrature modulation comprising an I path and a Q path, and a distinct focusing for each of the paths is done, the I path being focused on a first target antenna and the Q path being focused on a second target antenna.

This embodiment of the invention consists in considering separately the I and Q paths of an in-quadrature modulation, thus enabling the encoding of twice as many bits, in focusing the I path on one target antenna, and the Q path on another target antenna. It can be noted that the first and second target antennas can be the same, since the target antennas of the I and Q paths are chosen independently.

The modulation is for example a QAM Y type modulation with $Y=P\times P$.

According to another embodiment of the invention, the source signal is an OFDM type multicarrier signal and the pre-filtering is implemented selectively and simultaneously for at least two OFDM sub-carriers.

Here again, this embodiment enables the encoding of a greater number of information bits, in focusing the I path and the Q path independently and in doing so for each sub-carrier.

An embodiment of the invention also pertains to a method for receiving a signal sent by a transmitter, said method for receiving implementing $N_R$ receiving antennas with $N_R$ being greater than or equal to 2.

According to an embodiment of the invention, such a method for receiving comprises the following steps:
 identifying at least one antenna, called a target antenna, among said $N_R$ receiving antennas, on which said sent signal is focused by said transmitter;
 determining, as a function of said at least one identified target antenna, a binary sequence value considered as received.

Thus, once the receiver has identified or estimated the target antenna chosen by the transmitter, it is possible to determine the value of the corresponding binary sequence according to at least one association, predetermined at the time of sending, of a binary sequence value with a receiving antenna.

In this way, the signal received by the target antenna is not decoded in itself, but the fact that it can identify the target antenna chosen by the transmitter enables the receiver to know the value of the binary sequence of the source signal. The complexity of the receiver is thus reduced.

According to one embodiment of the invention, at the identification step, the identified target antenna is the antenna having a received signal power that is the highest.

According to an embodiment of the invention, the receiver does not have a priori knowledge of the target antenna chosen by the transmitter and must therefore make an estimation as to which is this target antenna.

According to an embodiment of the invention, the determining of the target antenna can be done in different ways.

As indicated here above, one of these ways is for example the detection of the antenna having received a signal power that is the highest.

Indeed, during the focusing of the signal on a target antenna, the power of the received signal is not concentrated solely on the chosen target antenna. It is sufficiently so, however, to enable making an estimation as to which is the target antenna by simple detection of power on all the antennas.

Other techniques for detecting the target antenna, also called techniques for detecting the focal point, are described in greater detail here below with reference to embodiments of the invention.

According to one embodiment of the invention, the method for receiving comprises a step for receiving at least one rule, predetermined at the time of sending, for associating a binary sequence value with one of said $N_R$ receiving antennas.

According to this embodiment of the invention, the association or associations preliminary determined by the transmitter are transmitted to the receiver and/or to one or more of the receiving antennas implemented.

According to other embodiments, the association or associations determined by the transmitter are known to the receiver when it is put into service, by preliminary programming for example.

According to one particular embodiment of the invention, the method for receiving comprises, in addition, a step for receiving a piece of information for assistance in determining at least one binary sequence value considered as received.

In this way, one or more initial antennas can be added at reception (in addition to the target antennas chosen for the focusing operations) to encode external information to be transmitted (information on phase, order of arrival of the bits etc), called information for assistance in determining or decision assistance information.

For example, should one or more simultaneous focusing operations be implemented, this information for assistance in determining can indicate the order of the binary sequences considered as received by the receiver, on each of the target antennas identified, so that the receiver can "rebuild" the source signal to be considered as received.

According to another aspect of an embodiment of the invention, the method for receiving additionally comprises a step for demodulating a signal received at the target antenna so as to obtain a binary sequence of the additional source signal, called a second binary sequence.

Thus, the method according to an embodiment of the invention enables the reception also of the information, in the form of a modulated signal, in addition to the information encoded by the position of the target antenna. This information (second binary sequence) is demodulated classically and is added to the information (first binary sequence) deduced from the detection of the target antenna as described here above.

An embodiment of the invention also pertains to a transmitter of a source signal, comprising a plurality of binary sequences, towards $N_R$ receiving antennas, with $N_R$ being greater than or equal to 2.

According to an embodiment of the invention, such a transmitter comprises, for at least one first binary sequence of said source signal, means for pre-filtering for focusing, on at least one of said receiving antennas called a target antenna, of a signal to be sent; said target antenna and said associated pre-filtering for focusing being selected according to a value of said first binary sequence intended for being considered as received and means for sending said pre-filtered signal.

Such a transmitter is especially suitable to implement the method of transmission described here above. It is for example a base station or a communications terminal.

This transmitter could of course comprise the different characteristics of the method of transmission according to an embodiment of the invention. Thus, the characteristics and advantages of this transmitter are the same as those of the method of transmission and are not described in greater detail.

An embodiment of the invention also pertains to a receiver of a signal sent by a transmitter, implementing $N_R$ receiving antennas with $N_R$ being greater than or equal to 2.

According to an embodiment of the invention, such a receiver comprises:
 means for identifying at least one antenna, called a target antenna, among said $N_R$ receiving antennas, on which said sent signal is focused by said transmitter;
 means for determining, as a function of said at least one identified target antenna, a binary sequence value considered as received.

Such a receiver is especially suitable to implement the method for receiving described here above. It is for example a base station or a communications terminal.

This receiver could of course comprise the different characteristics of the method for receiving according to an embodiment of the invention. Thus, the characteristics and advantages of this receiver are the same as those of the method of transmission and are not described in greater detail.

An embodiment of the invention also pertains to a signal formed by a plurality of successive symbol times.

According to an embodiment of the invention, such as signal is focused, at each symbol time, on at least one specific antenna among $N_R$ receiving antennas, called a target antenna, and conveys, during a symbol time, a binary value as a function of said target antenna.

All the characteristics described here above can of course be combined, entirely or in part, for implementing a method of transmission according to an embodiment of the invention, a method for receiving, a transmitter, a receiver, or a signal according to an embodiment of the invention.

An embodiment of the invention also pertains to a computer program comprising instructions for implementing a method of transmission as described here above, when this program is executed by a processor, and to a computer program comprising instructions for implementing a method for receiving as described here above, when this program is executed by a processor.

BRIEF DESCRIPTION OF THE DRAWINGS

Other characteristics and advantages shall appear more clearly from the following description of a particular embodiment, given by way of a simple, illustratory and non-exhaustive example and from the appended drawings, of which.

DETAILED DESCRIPTION OF ILLUSTRATIVE EMBODIMENTS

1. General Principle

The general principle of an embodiment of the invention relies on the use of the position of the receiving antennas to encode the information to be transmitted, for example a plurality of binary sequences of a source signal to be transmitted.

To this end, it is necessary to be able to accurately target the information to be transmitted to one of the receiving antennas, called a target antenna.

A known time-reversal technique is used, so as to focus the energy on a specific antenna of a network of antennas.

At reception, the energy of the received signal is not concentrated only on the target antenna but is concentrated thereon sufficiently to enable this target antenna to be identified by a technique of detection of the focal point.

It is furthermore assumed that the channel is "invariant" on a large number of transmitted signals.

The position of an antenna therefore corresponds to the transmission of information bits.

Figure 1:
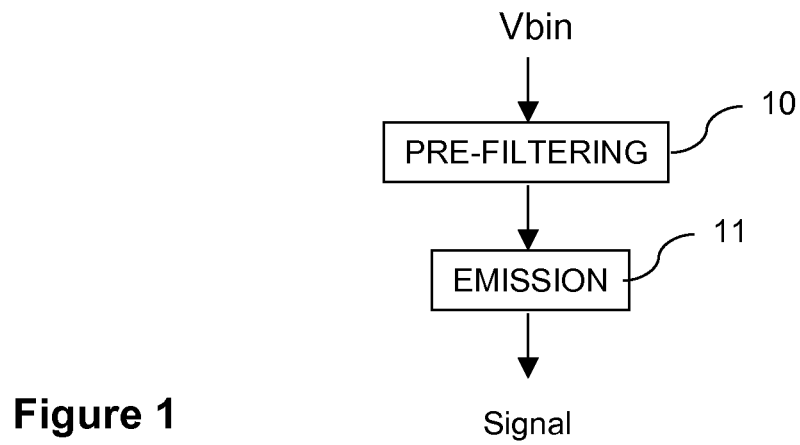
FIG. 1 illustrates the main steps of the method of transmission according to the general principle of an embodiment of the invention.

Thus, as illustrated in FIG. 1, the method of transmission of an embodiment of the invention comprises, for a binary sequence Vbin of a source signal to be transmitted, a pre-filtering step 10 for focusing a signal to be sent on a target antenna.

According to one embodiment of the invention, this pre-filtering is determined during a preliminary phase of configuration implementing a time-reversal step or spatial-focusing step delivering at least one pre-filter coefficient associated with each of the receiving antennas.

In this way, with each receiving antenna it is possible to associate one or more pre-filter coefficients to be applied to focus a signal towards this antenna.

A pre-filter coefficient of this kind corresponds, for example, to the temporal inverse of the pulse response of the channel between one or more sending antennas and one of the receiving antennas. The pre-filtering then comprises, for example, a step of convolution of the signal to be sent by the pre-filter coefficient associated with the target antenna.

Once the pre-filtering has been applied to the signal to be sent, the method of transmission of an embodiment of the invention comprises a step 11 for sending this pre-filtered signal.

In a simple case, the signal to be sent can, for example, be a pulse to which there is applied a pre-filtering as a function of the value of the binary sequence to be transmitted, and a predetermined association between a binary value and an antenna position.

The preliminary phase of configuration therefore also makes it possible to determine a plurality of associations between a binary value and an antenna position.

Here below, we present other examples where the signal to be sent is, for example, a signal modulated so as to transmit more information in a same symbol time.

Figure 2:
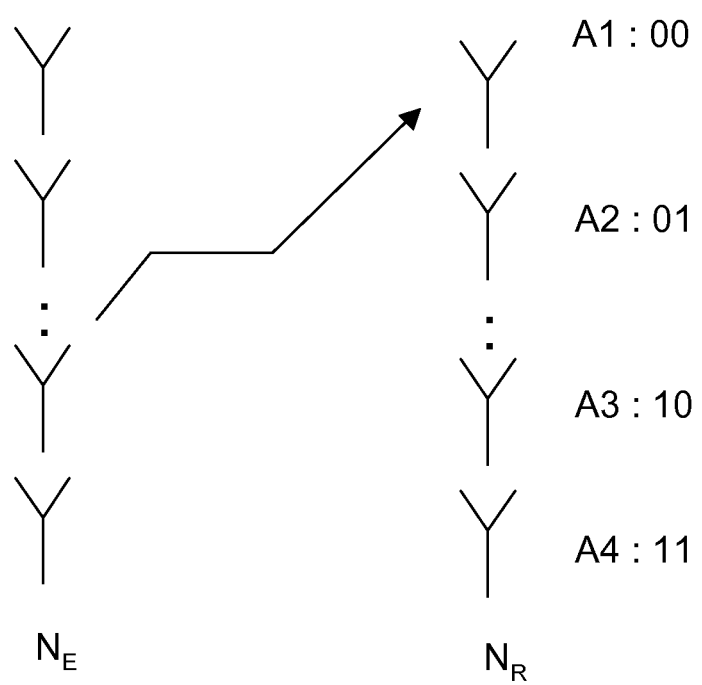
FIG. 2 is an example of implementation of the method of transmission according to the general principle of an embodiment of the invention.

In the case of a simple binary encoding of the position of the antennas, illustrated for example in FIG. 2 for four receiving antennas, the position of the antennas can be encoded by considering $N_R=4$ possible states given by $N_R=2^m=2^2$. A binary sequence comprising two information bits is then associated with a receiving antenna position and transmitted at each symbol time.

In this case, the number of receiving antennas is necessarily a power of two.

However, an additional antenna may be added to encode external information to be transmitted (information on phase, order of arrival of the bits etc.). This principle then leads to a multiple-level encoding or composite binary encoding which necessitates, at reception, a number of antennas greater than two, but not necessarily equal to a power of two.

In the example illustrated in FIG. 2, the antenna A1 is associated with the binary sequence of value 00, the antenna A2 is associated with the binary sequence of value 01, etc.

If there are $N_R$ receiving antennas, it is possible to encode $\log_2(N_R)$ information bits.

An embodiment of the invention therefore provides for interoperability between the transmission entity and the reception entity, especially as regards the associations between a binary value and an antenna position.

At the level of the transmission entity (for example the base station), such associations between target antenna and information bits can, for example, take the form of a two-column table of correspondence, with the index of the target antenna of the reception entity in one column and the series of corresponding bits in the other column.

These associations have to be known at reception.

For example, these associations are transmitted by the transmitter (for example the base station) to the receiver before the actual transmission of the source signal.

These associations can also be programmed in the receiver, for example in the form of a two-column correspondence table which is the same as described here above. They can finally be defined directly in the standard of the transmission-reception system.

Similarly, the pre-filtering used when sending must, in a manner of speaking, be known to the receiver, which then uses an appropriate technique for detecting the focal point, to identify the target antenna.

Indeed, if the receiver searches for the highest power antenna received, then the transmitter should have implemented a technique that maximizes the power on the target antenna, for example the time reversal, as described here above.

Here below, we present different embodiments of the invention.

2. Detailed Description of Different Embodiments

2.1 First Embodiment

Figure 3A:
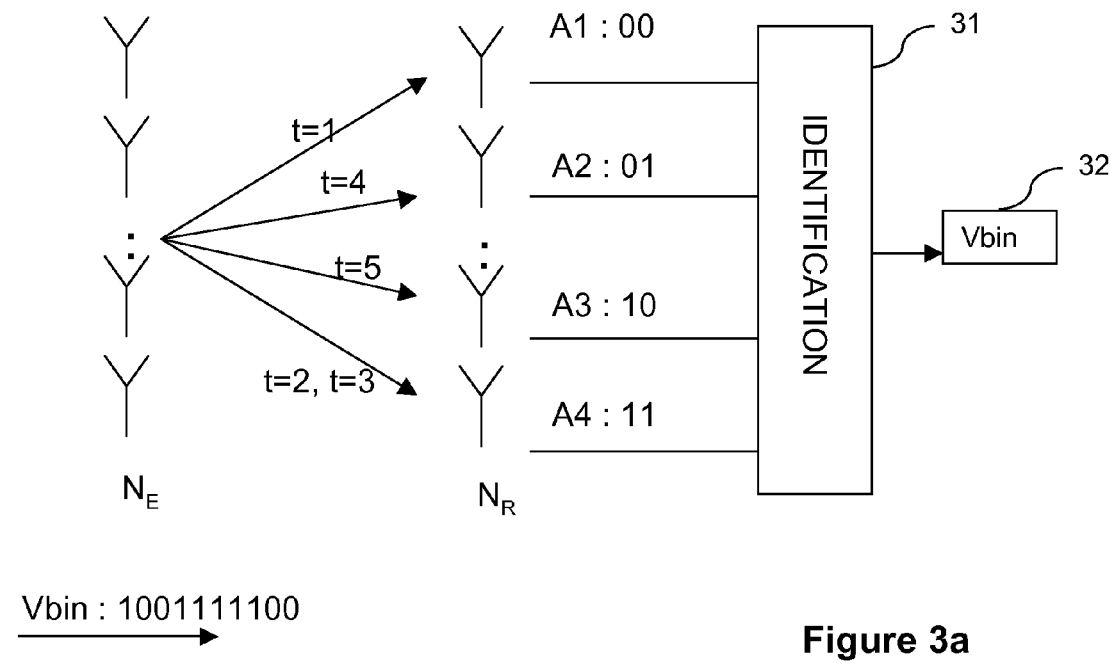
FIG. 3a illustrates an example of implementation of the method of transmission and the main steps of the method for receiving according to a first embodiment of the invention.

FIG. 3a illustrates a first variant of a first embodiment of the invention implementing a simple binary encoding of the position of the receiving antennas.

In this case, it has been seen that the number of antennas in reception $N_R$ is a power of two and more particularly equal to four in this example.

We consider the following four binary sequences to be transmitted successively at each symbol time: 00 to t=1, 11 to t=2, 11 to t=3, 10 to t=4 and 10 to t=5. These binary sequences correspond to the following source signal to be transmitted: 1001111100.

Here below, we consider the following associations, determined during the preliminary phase for configuring the transmission method of an embodiment of the invention:

binary value 00 associated with the antenna A1;
binary value 01 associated with the antenna A2;
binary value 10 associated with the antenna A3;
binary value 11 associated with the antenna A4.

The transmitter station focuses a signal to be sent, for example a pulse, respectively at each symbol time t, to the receiving antennas: A1, A4, A4, A2 and A3.

At reception, a step 31 for identifying the target antenna is implemented at each sampling instant.

This identification corresponds to a detection of the focal point chosen when sending.

For example, at each sampling instant, each antenna A1, A2, A3 and A4 measures the power received (by simply raising the received signal to the power of two). A selection of the maximum power corresponding to each antenna is then done, so as to identify the target antenna chosen when sending.

A step 32 for determining a binary value Vbin considered as received is then implemented by the receiver as a function of the target antenna identified.

There is therefore truly correspondence between the maximum power measured, corresponding to an antenna position and the binary sequence transmitted.

The receiver does not have any other processing to perform.

There are other existing techniques for detecting the focal point, as well as techniques designed to assess the quality of the focusing.

For example, focusing quality metrics and methods to evaluate them exist, among them a metric based on the measurement of a rate of symmetry of the received signal, a metric based on the measurement of the power received relative to the reference power, or again a metric based on a standardized measurement of "delay spread", these metrics having values ranging from 0 to 1.

Taking the measurement of one of these metrics as a basis, the detection of the target antenna can be done in two ways:

comparison between antennas: the quality metric is measured for each of the antennas, the antenna having the highest metric value is identified as being the target antenna;

comparison with a threshold: the quality metric is measured for each of the antennas, the antenna having a metric value above a threshold is identified as being the target antenna. If several antennas have a metric value higher than the defined threshold, then the above-described method using comparison of antennas is used to identify the target antenna.

Figure 3B:
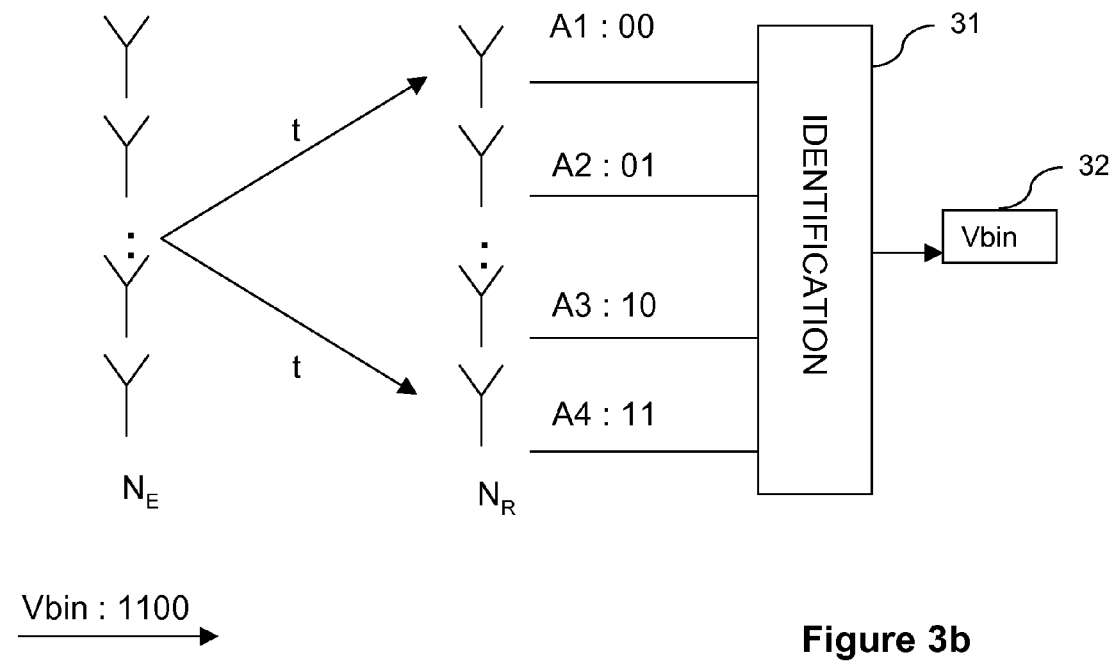
FIG. 3b illustrates a variant of this first embodiment of the invention.

FIG. 3b illustrates a second variant of the first embodiment of the invention, implementing a simple binary encoding of the position of the receiver antennas and a focusing on several receiving antennas simultaneously, in order to increase the transmission bit rate.

In the example of FIG. 3b, a simultaneous focusing on both antennas A1 and A4 is implemented, thus enabling for example the transmission of the binary sequence 1100 in a single symbol time.

To determine the order of bits at reception, several techniques can be used.

The first technique consists in focusing a different power signal on the two antennas A1 and A4, in allocating for example a higher power to the most significant bits. At reception, it is enough to analyze the power of the received signals and allocate an order to the binary values corresponding to the identified target antennas, in ascending order of power values. The order of the bits of the binary sequence transmitted then corresponds to the ascending order of the power values of the received signals.

A second technique is that of encoding the phase of the focused signal as a function of the reception order. For example, if the phase of the received signal is equal to 0, then the binary value associated is deemed to correspond to the first two bits, of the binary sequence transmitted, and if the phase is equal to Π, then the associated binary value is deemed to correspond to the last two bits of the binary sequence transmitted.

It is of course possible to extend this phase encoding as a function of the number of antennas focused simultaneously.

Similarly if, in the binary sequence to be transmitted, identical neighboring bits are found, for example 0000, it is also possible to adjust the power value of the focused signal by doubling the value for example. The receiver detecting a doubled power knows that the associated binary sequence is 0000 and not only 00.

2.2 Second Embodiment

Figure 4A:
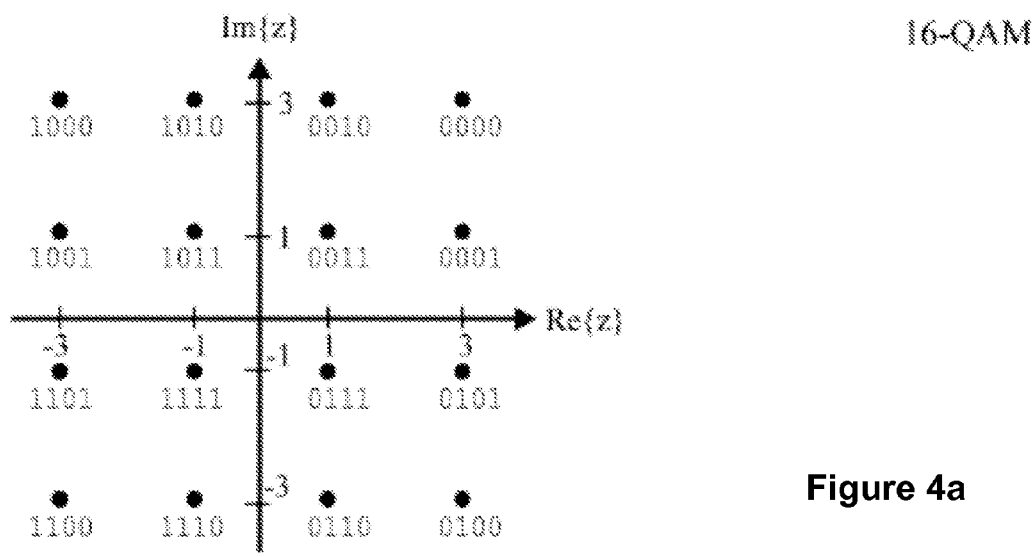
FIG. 4a illustrates a representation of a constellation of a 16QAM modulation.
Figure 4B:
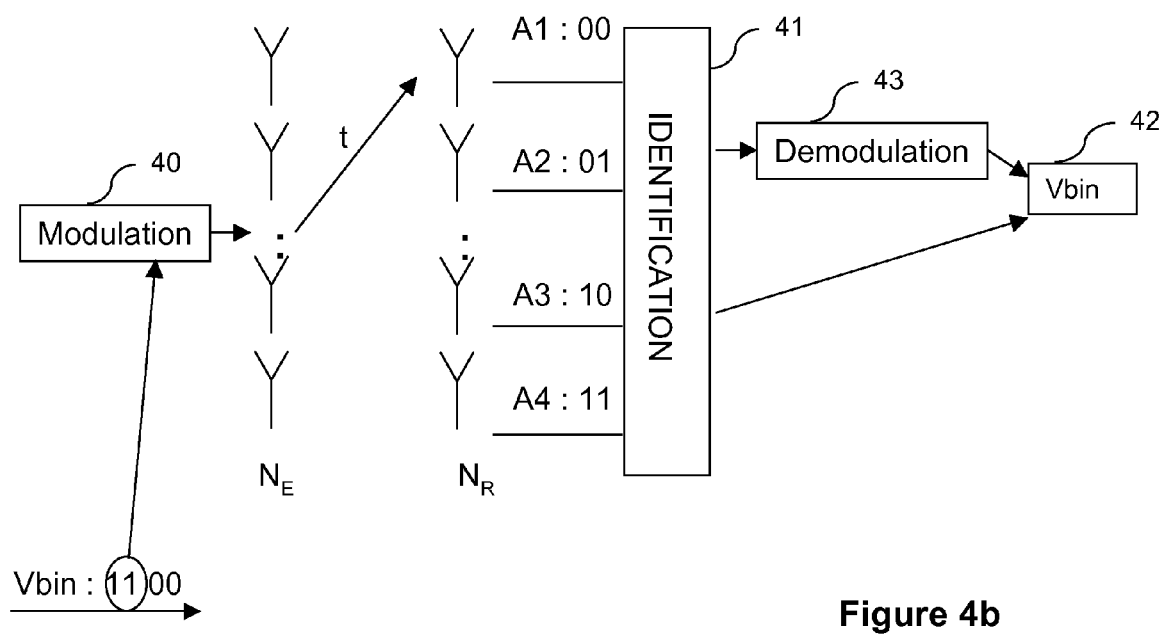
FIG. 4b illustrates an example of implementation of the methods of transmission and reception according to a second embodiment of the invention.

FIGS. 4a and 4b illustrate a second embodiment of the invention, when the signal to be sent is a modulated signal.

We consider for example a binary sequence to be transmitted, modulated by a QAM16 modulation, as illustrated in FIG. 4a, and therefore comprising four bits per symbol.

In addition, we consider a system, illustrated in FIG. 4b, implementing four receiving antennas, each encoding two bits as in the first embodiment.

It therefore remains for the transmitter to modulate the other two bits of the symbol by a QAM4 modulation.

FIG. 4b provides a more particular illustration of an example of transmission of the binary sequence 1100, where the first two bits (00) are encoded by focusing on the antenna A1 and the second two bits are modulated classically during a step 40.

Then, this modulated signal is focused by the antenna A1 at the symbol time t.

At reception, a step 41 for identifying the target antenna is implemented according to one of the techniques described here above. This step 41 is then used to determine a first part of the binary sequence to be transmitted, namely the binary value associated with the identified target antenna.

A step 43 of demodulation is also performed on the signal received at this target antenna A1. This step makes it possible to determine the second part of the binary sequence to be transmitted, corresponding to the two bits modulated when sending. In the example, a classic QAM4 type demodulation is done.

Finally, the receiver implements a step 42 for determining a binary value Vbin deemed to be received on the basis of the two binary sequences determined firstly as a function of an identification of the target antenna and secondly after demodulation of the signal received at the identified target antenna.

More generally, if it is desired to transmit a signal modulated by a QAM X type modulation where $X=2^{nb}$, where nb is the number of bits per modulation signal, then $\log_2(N_R)$ bits are encoded by the position of the antenna and $(nb-\log_2(N_R))$ bits are modulated classically.

This configuration induces a constraint on the number $N_R$ of receiving antennas which must be equal to a power of two.

We then obtain a transmission of a QAMX modulation simplified to a QAM ($2^{nb-\log_2(NR)}$) modulation, by spatial focusing of the energy towards a chosen target receiving receiver antenna.

The structure of the receiver can then be simplified in implementing only a QAM($2^{nb-\log_2(NR)}$) type modulation since $\log_2(N_R)$ bits of the symbol correspond to the position of the antenna.

Consequently, it is possible for example to transmit a QAM16 modulation in MIMO and obtaining the performance values of a QPSK modulation in SISO.

In the example of modulation illustrated in FIG. 4a, if it is taken that the first two bits of the symbol encode for an antenna position, then the top right-hand quadrant corresponds to the position of the antenna A1, the bottom left-hand quadrant corresponds to the position of the antenna A4, etc.

It remains for the receiver to determine the other two bits by classic QAM4 demodulation of the signal received on the identified target antenna.

This embodiment of the invention can be extended to a QAM64 type modulation where the two antenna position bits encode for the quadrant and the other four bits are demodulated by a QAM16 demodulator.

Thus, a QAMX type modulation can be reduced to QAMY type modulation where $Y=2^{(nb-\log_2(NR))}$.

In this way, with $N_R$ receiving antennas and a classic QAMY modulation, the method according to this embodiment of the invention enables the encoding of nb bits with $nb=\log_2(N_R)+\log_2(Y)$.

We shall now consider the case where the spatial binary encoding associated with the position of the antennas is composite, i.e. one or more additional antennas can be added to encode external information to be transmitted (phase, order of arrival of bits, etc.), as already indicated here above.

In this case, the number of transmitted bits associated with the position of the antennas is given by $nb1=\text{Log}_2(N_R)$ and the number of bits corresponding to the additional information for assistance with decision-making in reception for the bits transmitted on the corresponding antenna is given by nb2.

This configuration makes it possible to remove the constraint on the number $N_R$ of receiving antennas, which must always be greater than two but not necessarily equal to a power of two.

The nb1 and nb2 bits are added to the $nb3=\text{Log}_2(Y)$ bits classically transmitted by a Y-PSK or QAM-Y type digital modulation.

In short, a binary sequence of nb bits to be transmitted can be encoded as follows: $nb=nb1+nb2+nb3=\log_2(N_R)+nb2+\log_2(Y)$.

The external information associated with nb2 can be multiple information.

It can for example be associated with a certain type of modulation and encoding focused on an antenna Ni, when the encoding and the modulations are multiple.

In this case, the number of information bits transmitted on each antenna can be indexed by: $nb_i=\text{Log}_2(N_R)+nb2+\text{Log}_2(Y_i)$, where $Y_i$ corresponds to the number of states of the modulation transmitted on the Ni.

The external information associated with nb2 can also be associated with a particular temporal ordering of the bits transmitted on each antenna, which amounts to adding an additional encoding of the information transmitted.

The advantage of this configuration can be seen in the gains observed when the number of antennas in reception in the MIMO configurations is increased.

An embodiment of the invention then makes use, on the one hand, of the spatial binary information which assists in decision making on the bits transmitted on each antenna and takes advantage, on the other hand, of the diversity of the channel associated with an increasing number of receiving antennas which significantly improves the performance at the link level of the MIMO/SIMO radio systems.

2.3 Third Embodiment

Figure 5A:
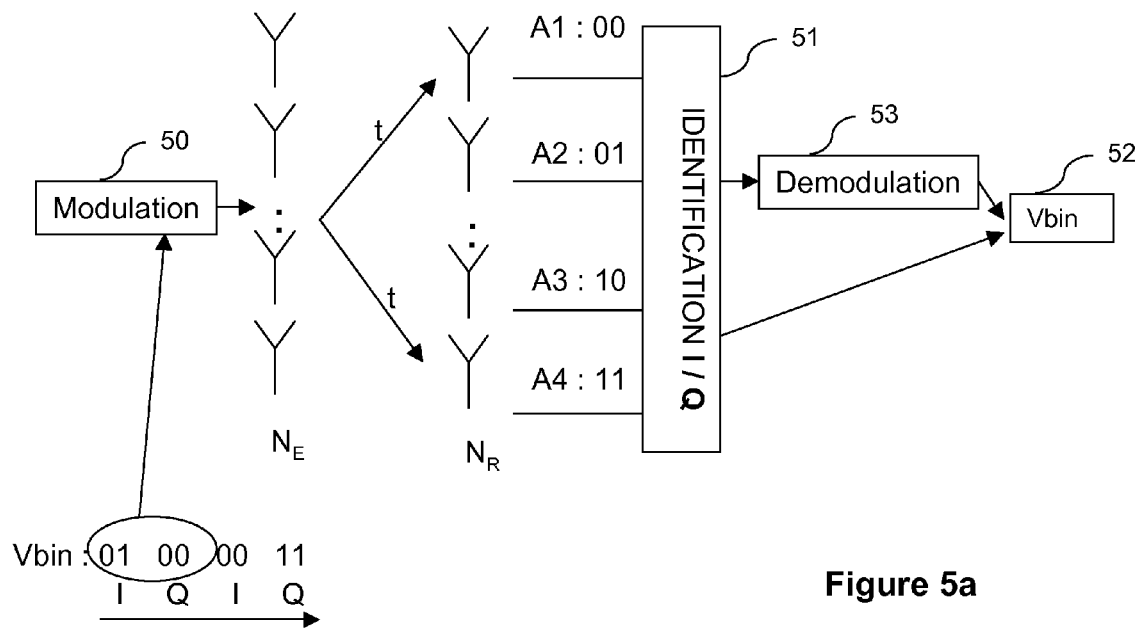
FIGS. 5a and 5b illustrate an example of implementation of the methods of transmission and reception according to a third embodiment of the invention.
Figure 5B:
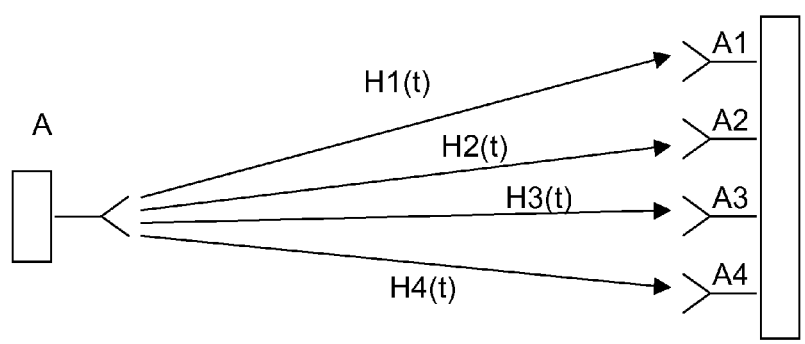

Referring now to FIGS. 5a and 5b, we present a third embodiment of the invention in which the I path and the Q path are considered separately for the QAMY type modulations, where P exists such that $Y=P \times P$.

For example, for a QAM4 type modulation, P is equal to two amplitudes. For a QAM16 type modulation, P equals four amplitudes. For a QAM64 type modulation, P equals eight amplitudes. For a QAM256 type modulation, P equals 16 amplitudes, etc.

We consider for example the case of a QAM16 type modulation, as illustrated in FIG. 4a.

The I path has P=4 possible states (+3 +1 −1 −3) and $N_R$ possible spatial positions (corresponding to the $N_R$ receiving antennas available) and similarly for the Q path.

In this case, the number of bits that can be transmitted in a symbol time is: $(\log_2(N_R)+\log_2(P)$ for the I path)+$(\log_2(N_R)+\log_2(P)$ for the Q path), i.e.: $2\times(\log_2(N_R)+\log_2(P))$.

In short, with $N_R$ antennas and a classic QAMY modulation where Y=P×P, it is possible to encode nb bits with nb=2× $(\log_2(N_R)+\log_2(P))$.

FIG. 5a illustrates this example in the case of a QAM16 modulation. In a single symbol time, the method of transmission according to this embodiment of the invention enables the transmission of the binary sequence Vbin (01 00 00 11), sub-divided into four two-bit binary sequences, as follows:
- a first modulation step 50 modulates the binary sequences 01 and 00 and transmits them classically on the I and Q paths:
  - 01 are the bits transmitted classically on the I path (i.e. the signal of the I path has an amplitude of '−1');
  - 00 are the bits transmitted classically on the Q path (i.e. the signal of the Q path has an amplitude of '+3').
- the two remaining binary sequences 00 and 11 are then encoded by spatial focusing, respectively on the antennas A1 and A4, as follows, in considering the I and Q paths separately:
  - 00 are the bits encoded by the spatial position of the I path (i.e. the I path is focused on the antenna A1);
  - 11 are the bits encoded by the spatial position of the Q path (i.e. the I path is focused on the antenna A4).

At reception, several steps are needed for the receiver to determine the binary sequence Vbin considered to have been received.

At a first stage, the receiver separates the signal of the I path from the signal of the Q path for each of the four antennas, and then identifies the antenna which is focused for the I path and for the Q path during an I/Q identification step 51.

This step enables the receiver to then determine the first binary sequence 00 by identification of the target antenna A1 for the I path and the second binary sequence 11 by identification of the target antenna A4 for the Q path.

The receiver then carries out a step 53 for demodulating the signals received on the target antennas A1 and A4 so as to determine the binary sequence 01 by demodulation of the signal of the I path and the binary sequence 00 by demodulation of the signal of the Q path.

The step 52 for determining a binary value Vbin considered as received is implemented by the receiver on the basis of the four binary sequences, determined one the one hand as a function of the identification of the target antennas for each of the I and Q paths and, on the other hand, after demodulation of the signal received on the identified target antennas for each of the I and Q paths.

FIG. 5b illustrates a representation of a transmission system according to this embodiment of the invention, with a transmission entity A and a reception entity implementing four receiving antennas A1, A2, A3 and A4. The associations between binary values and antenna positions are those already described here above.

We consider H1($t$), H2($t$), H3($t$) and H4($t$) to be the pulse responses of the channel between the transmission entity A and the receiving antennas respectively A1, A2, A3 and A4.

In a first example, if 00 is transmitted on the I path and 00 also on the Q path, then the signal to be transmitted by the transmission entity A is written as follows:

$$S(t)=H_1 \otimes \cos(2\pi ft)+H_1 \otimes \sin(2\pi ft).$$

The signal received by the antenna A1 is written as follows:

$$R_1(t)=H_1(t) \otimes H_1(-t) \otimes \cos(2\pi ft)+H_1(t) \otimes H_1(-t) \otimes \sin(2\pi ft).$$

The signal received by the antenna Ak for k≠1, is written as:

$$R_k(t)=H_k(t) \otimes H_1(-t) \otimes \cos(2\pi ft)+H_k(t) \otimes H_1(-t) \otimes \sin(2\pi ft).$$

In a second example, if 00 is transmitted on the I path and 01 on the Q path, then the signal to be transmitted by the transmission entity A is written as follows:

$$S(t)=H_1(-t) \otimes \cos(2\pi ft)+H_2(-t) \otimes \sin(2\pi ft).$$

The signal received by the antenna A1 is written as follows:

$$R_1(t)=H_k(t) \otimes H_1(-t) \otimes \cos(2\pi ft)+H_k(t) \otimes H_2(-t) \otimes \sin(2\pi ft).$$

The signal received by the antenna Ak for k≠1 and k≠2 is written as:

$$R_k(t)=H_k(t) \otimes H_1(-t) \otimes \cos(2\pi ft)+H_k(t) \otimes H_2(-t) \otimes \sin(2\pi ft).$$

It can be seen that the orthogonality between the sine and cosine carriers is potentially broken when the products of convolutions between pulse responses are non-real and when the two I and Q paths send different bits, as in the second example here above where the I path sends 00 while the Q path sends 01.

Should the orthogonality be broken, there can be interferences between the I path and the Q path, and the receiver must therefore implement an additional technique to separate the two paths, for example an MMSE-IC (minimum mean-square error (MMSE)-based iterative interference cancellation).

2.4 Fourth Embodiment

Figure 6A:
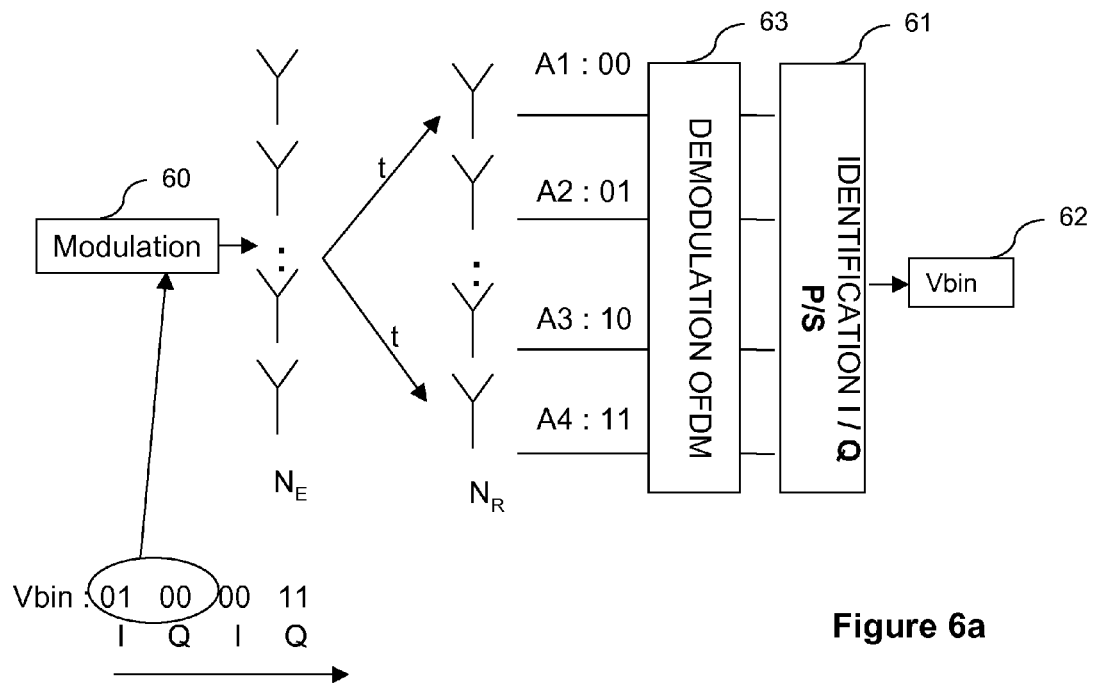
FIGS. 6a and 6b illustrate an example of implementation of the methods of transmission and reception according to a fourth embodiment of the invention.
Figure 6B:
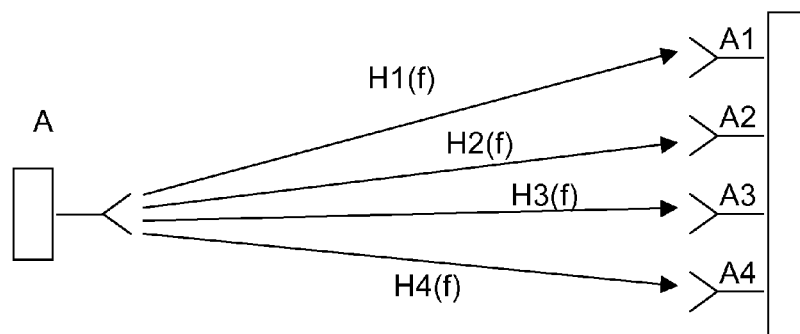

Referring now to FIGS. 6a and 6b, we present a fourth embodiment of the invention in which we also consider the I path, the Q path and each sub-carrier separately for an OFDM type modulation.

Thus, the position of the focused antenna is chosen independently for the I path, for the Q path and for each sub-carrier.

In short, with $N_R$ antennas and a classic QAMY modulation, where there exists P such that Y=P×P, and with Z OFDM sub-carriers, it is possible to encode nb bits with:

$$nb=Z\times 2\times(\log_2(N_R)+\log_2(P)).$$

FIG. 6a illustrates an example of this kind. The principle is the same as for the previous embodiment applied this time to each OFDM sub-carrier.

The binary sequence Vbin illustrated in FIG. 6a corresponds to a binary sequence to be transmitted during a symbol time for a sub-carrier.

Thus, the modulation step 60 is applied as in the above embodiment for each sub-carrier.

Similarly, at reception, a demodulation step 63 is implemented, in order to then enable application of a plurality of I/Q P/S identification steps 61, i.e. by sub-carrier, enabling the identification for each sub-carrier of the target antennas for the I and Q paths separately.

The step 62 for determining a binary value Vbin considered as received, for a sub-carrier, is implemented by the receiver on the basis of the four binary sequences determined on the one hand as a function of the identification of the target antennas for each of the I and Q paths, and on the second hand after demodulation of the received signal on the identified target antennas for each of the I and Q paths.

FIG. 6b illustrates a representation of a system of transmission according to this embodiment of the invention with a transmission entity A and a reception entity implementing four receiving antennas A1, A2, A3 and A4. The associations between binary values and antenna positions are those already described here above.

We consider H1(f), H2(f), H3(f) and H4(f) to be the transfer functions of the channel between the transmission entity A and the receiving antennas respectively A1, A2, A3 and A4.

We furthermore consider a system implementing 1024 OFDM sub-carriers.

In a first example, the sub-carriers $f_6$ and $f_7$ are examined more particularly.

If we transmit, for the sub-carrier $f_6$, 00 on the I path and 00 on the Q path too, then the signal to be transmitted by the transmission entity A on $f_6$ can be written as follows:

$$S(f_6)=H_1*(f_6)+jH_1*(f_6).$$

The signal received by the antenna A1 on $f_6$ can be written:

$$R_1(f_6)=|H_1(f_6)|^2+j|H_1(f_6)|^2.$$

If we transmit, for the sub-carrier $f_7$, 00 on the I path and 01 on the Q path, then the signal to be transmitted by the transmission entity A on $f_7$ can be written as follows $$S(f_7)=H_1*(f_7)+jH_2*(f_7).$$

The signal received by the antenna A1 on $f_7$ can be written:

$$R_1(f_7)=|H_1(f_7)|^2+jH_1(f_7)H^*_2(f_7).$$

The signal received by the antenna A2 on $f_7$ can be written:

$$R_2(f_7)=H_2(f_7)H^*_1(f_7)+j|H_1(f_7)|^2.$$

Here too it can be seen that, for a given sub-carrier, the orthogonality between the sine and cosine carriers is potentially broken when the products between transfer functions are non-real and when the two I and Q paths send different bits.

Should the orthogonality be broken, the interference between the I path and the Q path can exist and the receiver must therefore implement an additional technique to separate the two paths, for example an MMSE-IC (minimum mean-square error (MMSE)-based iterative interference cancellation) type of detector.

However, the orthogonality between sub-carriers is not broken.

3. Structures of a Transmitter and a Receiver

Figure 7:
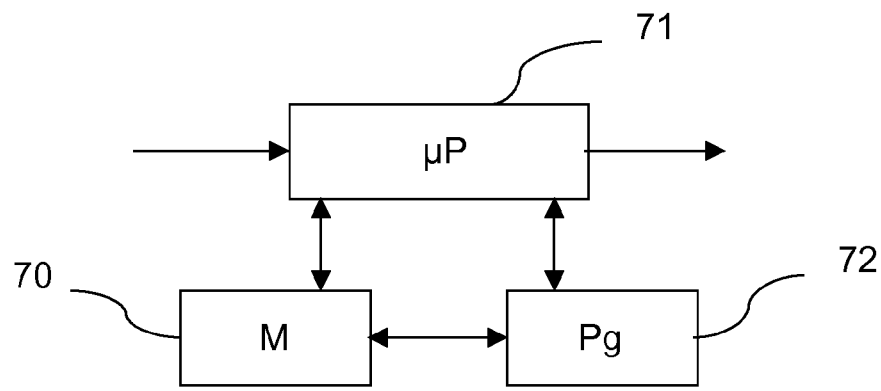
FIGS. 7 and 8 respectively illustrate an example of a transmitter and a receiver according to one embodiment of the invention.
Figure 8:
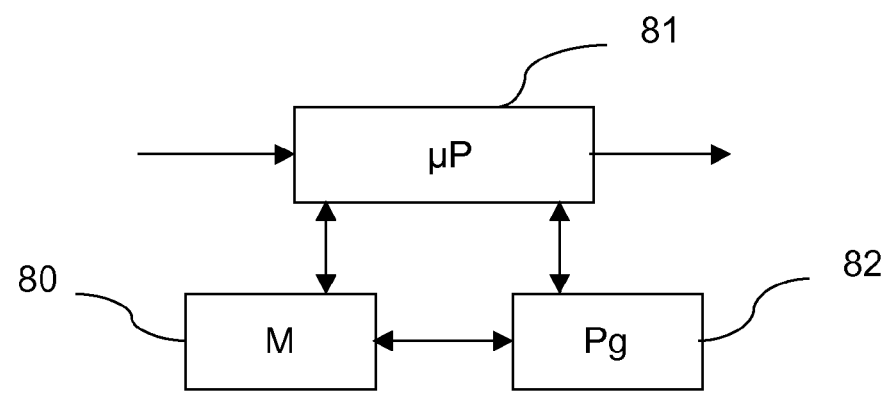

Finally, referring to FIGS. 7 and 8, we present the simplified structures respectively of a transmitter and a receiver according to the embodiments described here above.

As illustrated in FIG. 7, a transmitter comprises a memory 71 comprising a buffer memory, a processing unit 72, equipped for example with a microprocessor µP and driven by the computer program 73 implementing the method for transmitting according to an embodiment of the invention.

At initialization, the code instructions of the computer program 73 are for example loaded into a RAM and then executed by the processor of the processing unit 72. The processing unit 72 inputs a source signal to be transmitted. The microprocessor of the processing unit 72 implements the steps of the method of transmission described here above, according to the instructions of the computer program 73. To this end, the transmitter comprises, in addition to the buffer memory 71, for at least one first binary sequence of said source signal, means of pre-filtering for focusing, on at least one of the receiving antennas, called a target antenna, of a signal to be sent, the target antenna and the associated pre-filtering for focusing being selected according to a value of the first binary sequence intended for being considered as received and means for sending the pre-filtered signal. These means are driven by the microprocessor of the processing unit 72.

As illustrated in FIG. 8, a receiver comprises a memory 81 comprising a buffer memory, a processing unit 82 equipped for example with a processor µP and driven by the computer program 83 implementing the method of transmission according to an embodiment of the invention.

At initialization, the code instructions of the computer program 83 are for example loaded into a RAM and then executed by the processor of the processing unit 82. The processing unit 82 inputs a signal sent by a transmitter. The microprocessor of the processing unit 82 implements the steps of the reception method described here above according to the instructions of the computer program 83. To this end, the receiver comprises, in addition to the buffer memory 81, means for identifying at least one antenna, called a target antenna, among the $N_R$ receiving antennas, on which the sent signal is focused by the transmitter, means for determining, as a function of the identified target antenna, a binary sequence value considered as received. These means are driven by the microprocessor of the processing unit 82.

The invention claimed is:

1. A method of transmission of a source signal comprising a plurality of binary sequences towards $N_R$ receiving antennas, with $N_R$ being greater than or equal to 2, wherein the method implements, for at least one first binary sequence of said source signal:
   pre-filtering a signal to be sent with an associated pre-filter for focusing the signal on at least one of said receiving antennas called a target antenna, delivering a pre-filtered signal;
   selecting said target antenna and said associated pre-filter according to a value of said first binary sequence intended for being considered as received, and
   sending said pre-filtered signal.

2. The method of transmission of a source signal according to claim 1, wherein the method comprises a preliminary phase of configuration comprising a step of associating a binary sequence value with one of said $N_R$ receiving antennas.

3. The method of transmission of a source signal according to claim 1, wherein the method comprises a step of transmission, towards at least one of said $N_R$ receiving antennas, of at least one predetermined rule for associating a binary sequence value with one of said $N_R$ receiving antennas.

4. The method of transmission of a source signal according to claim 1, wherein the method comprises at least two simultaneous steps of sending a pre-filtered signal to at least two distinct target antennas.

5. The method of transmission of a source signal according to claim 1, wherein the method comprises, in addition, a step of sending a piece of information for assistance in determining, at reception, the at least one binary sequence of said source signal.

6. The method of transmission of a source signal according to claim 1, wherein the method comprises, in addition, a step of modulating a second binary sequence of said source signal, delivering said signal to be sent.

7. The method of transmission of a source signal according to claim 6, wherein said modulation is an in-quadrature modulation comprising an I path and a Q path and a distinct focusing is done for each of said paths, said I path being focused on a first target antenna and said Q path being focused on a second target antenna.

8. The method of transmission of a source signal according to claim 1, wherein said source signal is an OFDM-type multicarrier signal and said pre-filtering is done selectively and simultaneously for at least two OFDM sub-carriers.

9. A method for receiving a signal sent by a transmitter, said method comprising:
implementing $N_R$ receiving antennas, with $N_R$ being greater than or equal to 2;
identifying at least one antenna, called a target antenna, among said $N_R$ receiving antennas, on which said sent signal is focused by said transmitter; and
determining, as a function of said at least one identified target antenna, a binary sequence value considered as received.

10. The method for receiving a signal sent according to claim 9, wherein, at said identification step, said identified target antenna is the antenna having a received signal power that is the highest.

11. The method for receiving a signal according to claim 9, wherein the method comprises a step of receiving at least one rule, predetermined when sending, for associating a binary sequence value with one of said $N_R$ receiving antennas.

12. The method for receiving a signal according to claim 9, wherein the method comprises, in addition, a step of receiving a piece of information for assistance in determining at least one binary sequence value considered as received.

13. A transmitter of a source signal, comprising a plurality of binary sequences, towards $N_R$ receiving antennas, with $N_R$ being greater than or equal to 2, wherein the transmitter comprises, for at least one first binary sequence of said source signal:
means for pre-filtering a signal to be sent with an associated pre-filter configured for focusing, on at least one of said receiving antennas, called a target antenna, delivering a pre-filtered signal;
means for selecting said target antenna and said associated pre-filter according to a value of said first binary sequence intended for being considered as received; and
means for sending said pre-filtered signal.

14. A receiver of a signal sent by a transmitter, implementing $N_R$ receiving antennas with $N_R$ being greater than or equal to 2, wherein the receiver comprises:
means for identifying at least one antenna, called a target antenna, among said $N_R$ receiving antennas, on which said sent signal is focused by said transmitter; and
means for determining, as a function of said at least one identified target antenna, a binary sequence value considered as received.

15. A method comprising:
generating a signal formed by a plurality of successive symbol times, wherein the signal is focused, at each symbol time, on at least one specific antenna among $N_R$ receiving antennas, called a target antenna, and conveys, during a symbol time, a binary value as a function of said target antenna; and
transmitting the signal from a transmitter.

16. A non-transitory computer-readable memory comprising a computer program stored thereon and comprising instructions for implementing a method of transmission of a source signal comprising a plurality of binary sequences towards $N_R$ receiving antennas, with $N_R$ being greater than or equal to 2, when this program is executed by a processor, wherein the method implements, for at least one first binary sequence of said source signal:
pre-filtering a signal to be sent with an associated pre-filter for focusing the signal on at least one of said receiving antennas called a target antenna, delivering a pre-filtered signal;
selecting said target antenna and said associated pre-filter being selected according to a value of said first binary sequence intended for being considered as received, and sending said pre-filtered signal.

17. A non-transitory computer-readable memory comprising a computer program comprising instructions for implementing a method for receiving a signal sent by a transmitter, when this program is executed by a processor, said method comprising:
implementing NR receiving antennas, with NR being greater than or equal to 2;
identifying at least one antenna, called a target antenna, among said NR receiving antennas, on which said sent signal is focused by said transmitter; and
determining, as a function of said at least one identified target antenna, a binary sequence value considered as received.

* * * * *